(12) United States Patent
Lin

(10) Patent No.: US 6,426,802 B1
(45) Date of Patent: Jul. 30, 2002

(54) COMPLEMENTARY HALFTONE SCREENS FOR HIGHLIGHT PRINTING

(75) Inventor: Ying-wei Lin, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/232,637

(22) Filed: Jan. 19, 1999

(51) Int. Cl.[7] .............. H04N 1/52; H04N 1/60; G06K 15/02
(52) U.S. Cl. .......... 358/1.9; 358/534; 358/518
(58) Field of Search ............ 358/1.9, 518, 520, 358/521, 534, 536, 298, 456; 382/167, 162

(56) References Cited

U.S. PATENT DOCUMENTS

| | | | |
|---|---|---|---|
| 4,078,929 A | | 3/1978 | Gundlach |
| 4,903,048 A | * | 2/1990 | Harrington .......... 358/298 |
| 5,223,857 A | | 6/1993 | Loce et al. |
| 5,237,517 A | * | 8/1993 | Harrington et al. ...... 382/162 |
| 5,260,799 A | | 11/1993 | Loce et al. |
| 5,875,260 A | * | 2/1999 | Ohta .......... 358/518 |
| 5,920,682 A | * | 7/1999 | Shu et al. .......... 358/1.9 |
| 5,982,924 A | * | 11/1999 | Power et al. .......... 358/1.9 |
| 6,115,493 A | * | 9/2000 | Harrington .......... 382/162 |
| 6,198,552 B1 | * | 3/2001 | Nagae .......... 382/167 |

* cited by examiner

Primary Examiner—Scott Rogers
(74) Attorney, Agent, or Firm—Oliff & Berridge, PLC

(57) ABSTRACT

A method and apparatus for generating highlight color tints for DND printing from full color image information uses complementary halftone screens. Image information that is out of a printing gamut is mapped into the printing gamut and the complementary halftone screens are applied to generate tint information while preserving gradation.

17 Claims, 3 Drawing Sheets

FIG. 5
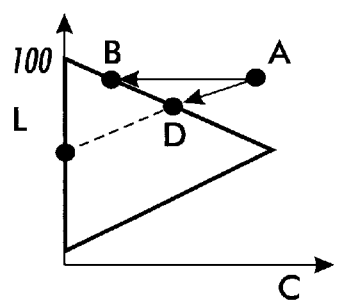
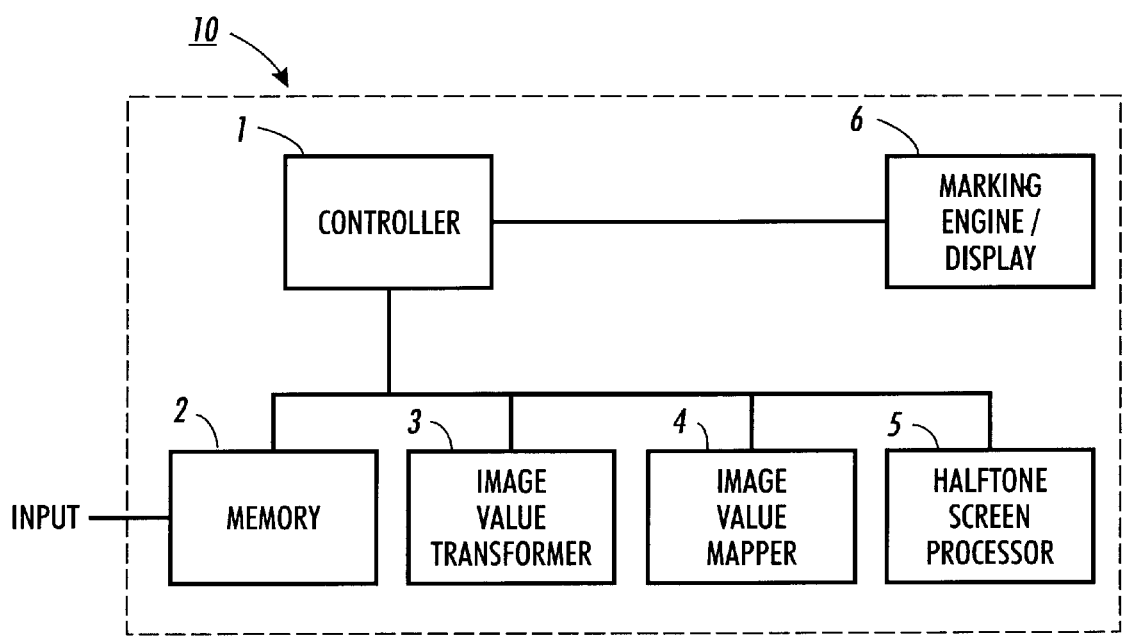
FIG. 6

COMPLEMENTARY HALFTONE SCREENS FOR HIGHLIGHT PRINTING

BACKGROUND OF THE INVENTION

1. Field of Invention

This invention relates to converting full color image information for dot next to dot (DND) printing on a highlight color printer. In particular, the invention relates to using complementary halftone screens in a way that generates highlight color images for input full color image information that preserves gradation and does not require complicated look-up tables.

2. Description of Related Art

Highlight color printers that print images comprising black dots and one other color of dots, e.g. red dots, are known, as described in U.S. Pat. Nos. 4,078,929, 5,223,857, and 5,260,799. Such highlight color printers are typically called K+1 printers, where K+1 represents the fact that the printer uses black [K] and one other color, typically red, to produce images. Since on such highlight color printers a dot can be black or red, but not both, the printing method is called dot next to dot (DND). When reproducing a full color image using a highlight color printer, the full color image must first be converted into highlight color images of black and red, i.e. K and R values representing the highlight color image, where K represents black and R represents red. This K–R image must then be converted to a binary image, by halftoning, for printing. The binary K–R image will be called the highlight color tint or simply the tint. The two step conversion is typically performed using a look-up table.

However, the look-up table approach is cumbersome, especially if gradation in the original image is to be preserved. For example, if 24-bit full color image information is provided, there are approximately 16 million different possible input values. Coarse quantization of the input can be used to reduce the size of the look-up table, but generating and implementing the look-up table, especially to satisfy the DND printing requirement, is not straightforward.

SUMMARY OF THE INVENTION

The invention provides a method and apparatus for converting full color image information to highlight color tints without using a complex look-up table.

The invention provides a method for generating highlight color tints for fall color image information that preserves gradation. According to the method, complementary halftone screens are applied to the highlight color image.

In one aspect of the invention, full color image information is converted to a highlight color printing space, such as the KR space, and converted pixel values in the printing space that are out of a printing gamut are mapped into the printing gamut before the halftone screens are applied.

In one aspect of the invention, full color information is transformed to the LCH color space. The H value for each pixel is dropped. If the resulting LC value is within the printing gamut, the LC value is transformed to KR values. If the LC value is not within the printing gamut, the LC value is mapped into the gamut and then transformed into KR values.

In one aspect of the invention, a printing gamut in the LC space is generated by mapping a line where K+R=Constant into the LC color space.

In one aspect of the invention, out-of-gamut LC values are mapped into the gamut by using a constant L value.

In one aspect of the invention, out-of-gamut LC values are mapped into the gamut by selecting a point within the gamut that lies on a line connecting a center point of the gamut on the L axis and the LC value.

The invention also provides an image forming apparatus that includes an image value transformer, an image value mapper and a halftone screen processor. Full color image information is converted to a highlight color printing space by the image value transformer. If the converted printing space value for a pixel is not within the printing gamut, the image value mapper maps the printing space value into the printing gamut to obtain a mapped printing space value. The halftone screen processor applies halftone screens to the mapped printing space value and other printing space values that are within the printing gamut to obtain highlight color tints.

In one aspect of the invention, the image forming apparatus also includes a controller for controlling the operation of the image value transformer, the image value mapper and the halftone screen processor.

In one aspect of the invention, the image forming apparatus also includes a memory for storing full color image information, highlight color image information, and highlight color tints.

In one aspect of the invention, the image forming apparatus also includes a display that produces an image based on the highlight color tints.

In one aspect of the invention, the image value transformer converts fill color image information into the LCH color space. If the LC value for a pixel is not in a printing gamut, the image value mapper maps the out-of-gamut LC value into the printing gamut. The mapped LC value and other LC values within the printing gamut are converted to a printing space. The halftone screen processor applies complementary halftone screens to the converted values in the printing space to obtain highlight color tints.

BRIEF DESCRIPTION OF THE DRAWINGS

The invention will be described in relation to the following drawings in which reference numerals refer to like elements, and wherein:

FIG. 5 is a graphical representation of two optional methods for mapping an out-of-gamut LC value to an LC value in the printing gamut; and FIG. 6 is a schematic block diagram of an image forming device in accordance with the invention.

DETAILED DESCRIPTION OF PREFERRED EMBODIMENTS

Figure 1:
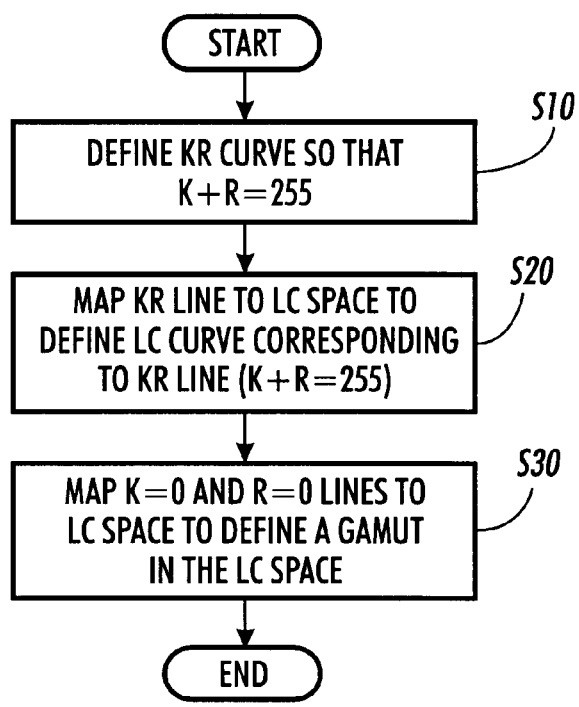
FIG. 1 is a flowchart of steps for generating a printing gamut in LC space in accordance with the invention.

Printing and display of an image herein both refer to either the display of an image on a display device, such as a CRT, LCD or other display, or generating a hard copy of the image, e.g. on a paper substrate.

The invention involves converting fall color image information to highlight color tints in such a way that gradation in the full color image represented by the full color image information is maintained in the highlight colorprint generated from the highlight color tints. One important aspect of the invention involves the halftone screen design that is used to screen the highlight color image information. In this case, complementary screens are used to generate tints used for printing and display.

As an example, assume that highlight color tint information is to be generated for a printer or other display that reproduces an image using black and red dots. A halftone screen function is used for each of the colors black (K) and red (R) to generate the highlight color tint information from image information in the printing color space, e.g. the KR space. In order to print using DND, the halftone screen functions are complementary such that:

$$S_K(i, j) = 255 - S_R(i, j) \quad (1)$$

where $S_K$ represents the halftone screen function for black dots, and SR represents the halftone screen function for red dots. In this case, the value 255 is used in Equation 1 because 8 bits per pixel is assumed for the K and R information. That is, K and R each range from 0 to 255 where K=255 is solid black, and R=255 is solid red. However, other values other than 255 would be used if for other bit ranges of K and R.

In this example, the complementary halftone screen functions are applied so that a black dot is printed if $S_K(i, j) < K$, and a red dot is printed if $S_R(i, j) < R$. However, a red dot and a black dot cannot both be printed in a single pixel location. Thus, if $S_K(i, j) < K$, we require that $S_R(i, j) > R$ and only a black dot is printed, and if $S_R(i, j) < R$, we require that $S_K(i, j) > K$, and only a red dot is printed.

Therefore, in this example the constraint that:

$$K + R \leq 255 \quad (2)$$

is imposed on the printing color space image data so that if the value K+R is greater than 255 for a given pixel, the KR value is out of the gamut for DND printing in accordance with the invention. Out-of-gamut values are mapped into the gamut in a manner that preserves gradation before the halftone screens are applied, as discussed more fully below.

To map out-of-gamut values to the printing gamut, it is often more convenient to work in the LC (lightness and chroma) space than to work in the printing space, such as the KR space. Thus, to handle out-of-gamut values, a printing gamut in the LC space is preferably generated.

Figure 2:
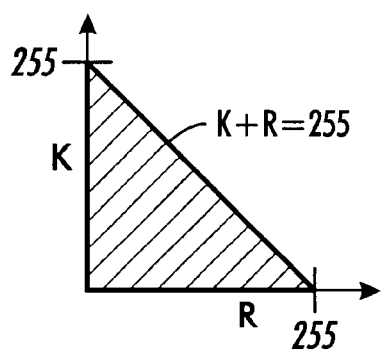
FIG. 2 is a graphical representation of an example gamut in KR space in accordance with the invention.
Figure 3:
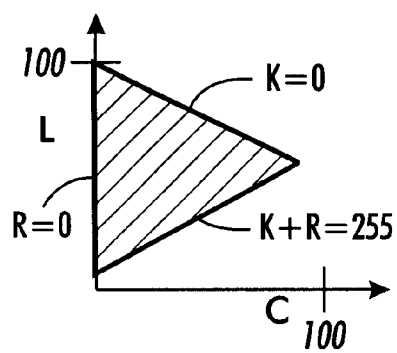
FIG. 3 is a graphical representation of the FIG. 2 gamut in LC space.

FIG. 1 is a flowchart of steps for generating a printing gamut in LC space. For the halftone screens mentioned above to operate properly, a printing gamut must be defined such that Equation 2 above is satisfied. Accordingly, in step S10, a KR curve is defined such that K+R=255. FIG. 2 is a graphical representation of the KR curve defined in step S10. Thus, the printing gamut, i.e. the shaded area shown in FIG. 2, is bounded by the KR curve and the K and R axes. In step S20, the KR curve is mapped into the LC space to define a LC curve that corresponds to the KR curve. FIG. 3 shows the LC curve that corresponds to the KR curve. In step S30, the K=0 and R=0 lines are mapped into the LC space, thereby defining a printing gamut in the LC space. The printing gamut in the LC space is the shaded area shown in FIG. 3.

Figure 4:
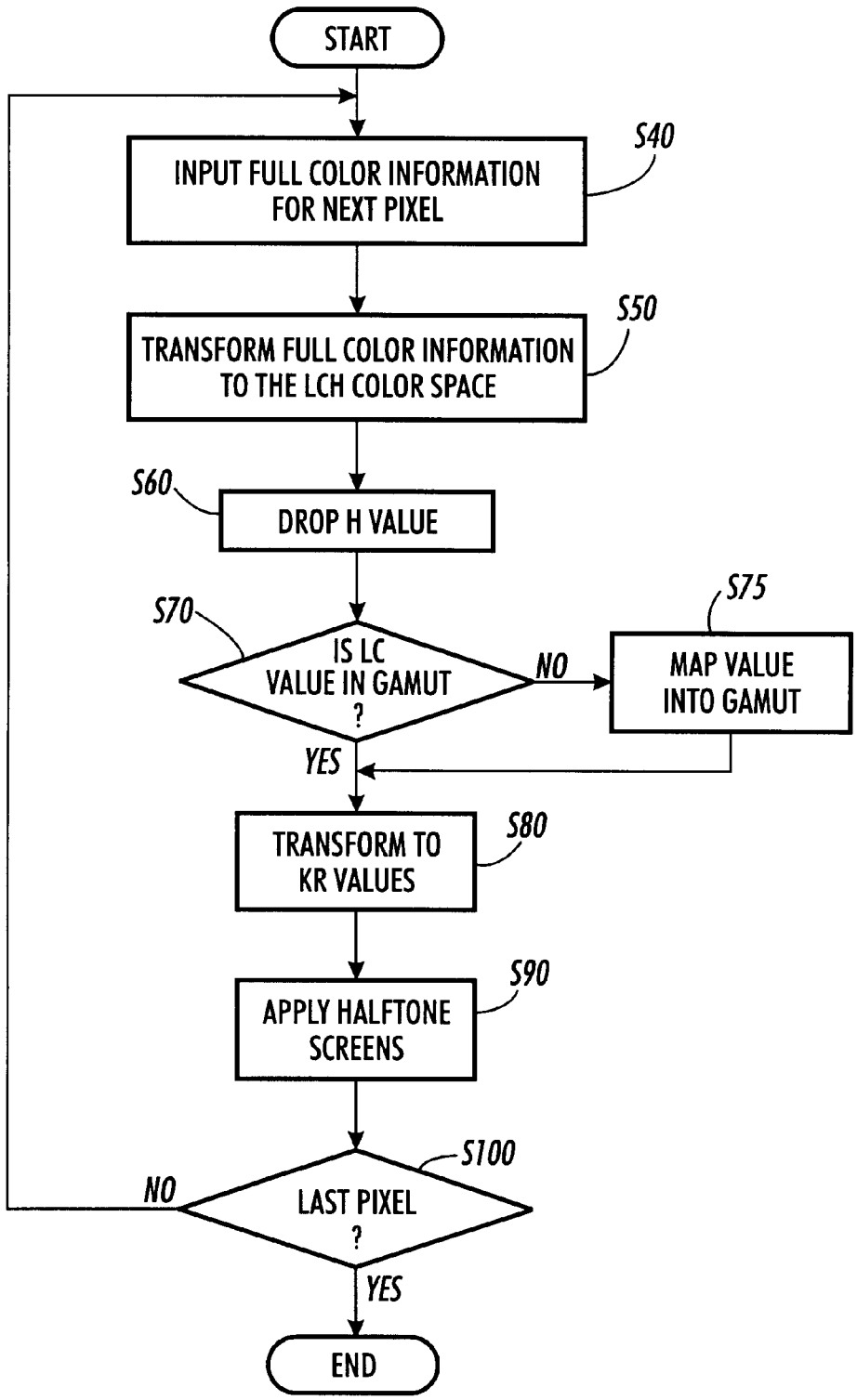
FIG. 4 is a flowchart of steps for generating highlight color tint information in accordance with the invention.

Once the printing gamut is defined in the LC space, full color image information can be processed in accordance with the invention to determine highlight color tint information as shown in FIG. 4. In step S40, full color information for a pixel, e.g., a 24-bit RGB value, is input. In step S50, the full color information is transformed into the LCH color space. In step S60, the H value is dropped because in this case, mixing red and black will produce only one hue. As mentioned above, for the complementary halftone screens to operate properly, input values must be in the printing gamut. Thus, in step S70 it is determined whether the LC values generated in step S50 are in the printing gamut. If the LC values are in the printing gamut, the LC values are transformed to KR values in step S80. Otherwise, the out-of-gamut LC values are mapped into the printing gamut in step S75. The mapped LC values are then transformed into KR values in step S80.

FIG. 5 shows two possible methods for mapping out-of-gamut LC values into the printing gamut. The out-of-gamut LC value A can either be mapped to LC value B by holding the L value at a constant, or by mapping the value A to a value D, which is at the intersection of a line connecting the value A and a center point O on the L axis, and the curve bounding the printing gamut, in this case the K=0 line. Both methods serve to map out-of-gamut values into the printing gamut while preserving gradation.

Once KR values are generated in step S80, the complementary halftone screens are applied in step S90. In DND printing, a printed pixel is either black or red, but not both. Thus, a black dot is printed if $K > S_K(i, j)$ and a red dot is printed if $R > S_R(i, j)$. As a result of defining the printing gamut in accordance with Equation 2, either $K > S_K(i, j)$ or $R > S_R(i, j)$, but not both. Accordingly, the output can be printed using a DND process. After the halftone screens are applied, it is determined whether the last pixel in the image has been processed in step S100. If the last pixel has not been processed, control jumps back to step S40 to input the next fall color pixel value information.

FIG. 6 shows one embodiment of an image forming apparatus 10 in accordance with the invention. The image forming apparatus 10 can be a printer, photocopier, computer/printer system, computer/display system, etc. Plus, the image forming device 10 need not produce a hard copy image on a substrate such as paper. Instead, the image can be displayed on a computer monitor or other display device. Such displays can be but are not limited to CRT, LCD, and other bistable displays, such as rotating particle or so-called gyricon displays, electrophoretic displays, etc.

Full color image information is input into a memory 2 that is controlled by a controller 1. The fall color image information can be supplied by any means including a computer paint or draw application, a storage device, such as a CD-ROM or other volatile or non-volatile memory device, a communications network, etc. The controller 1 also controls an image value transformer 3, an image value mapper 4, and a halftone screen processor 5. A marking engine/display 6 also communicates with the controller 1 to provide an output based on highlight color tint information. As discussed above, the marking engine/display 6 can produce a hard copy image or display image on any one of the devices mentioned above.

Full color image information stored in the memory 2 is preferably transformed into the LCH color space by the image value transformer 3. For each pixel value, the controller 1 determines if the LC value is in the printing gamut that is stored in the controller 1 or in the memory 2. If the LC value is in the printing gamut, the image value transformer 3 transforms the LC values to KR values. Otherwise, the image value mapper 4 maps the LC values into the printing gamut using either the methods mentioned above or any other suitable and/or equivalent method. The LC values mapped into the printing gamut are then transformed into KR values. The halftone screen processor 5 applies the complementary halftone screens to the KR values to generate the highlight color tint information. Based on the tint information, the marking engine/display 6 produces a visual representation of the full color image.

The controller 1 preferably includes a general purpose computer that is programmed and has appropriate circuitry to supply the appropriate control signals to the elements of the image forming apparatus 10. The controller 1 can also be implemented, at least in part, as a single special purpose integrated circuit (e.g., ASIC) or an array of ASICs, each having a main or central processor section for overall, system-level control, and separate sections dedicated to performing various different specific computations, functions and other processes under the control of the central processor section. The controller 1 can also be implemented using a plurality of separate dedicated programmable integrated or other electronic circuits or devices, e.g., hardwired electronic or logic circuits such as discrete element circuits or programmable logic devices. The controller 1 also preferably includes other devices, such as volatile or non-volatile memory devices, communications devices, relays, motors, mechanical linkages, and/or other circuitry or components necessary to perform the desired input/output or other functions.

The image value transformer 3, image value mapper 4, and halftone screen processor 5 are preferably software modules that are executed by the controller 1 or any other suitable data processing apparatus. Alternately, the image value transformer 3, image value mapper 4, and/or halftone screen processor 5 can be implemented as hard-wired electronic circuits or other programmed integrated or other electronic circuits or devices, e.g., hardwired electronic or logic circuits such as discrete element circuits or programmable logic devices.

The method and apparatus discussed above with respect to the invention are only one example of a preferred method and apparatus. However, the method and apparatus can be modified and yet still be consistent with the invention. For example, transforming full color image information into the LCH color space is mainly done for convenience, and is not necessary. For example, the full color image information can be transformed directly into the KR space or any other printing, display or other space. In this case, out-of-gamut values are mapped into the printing gamut using any desired method and the complementary halftone screens applied to the resulting color space values. Thus, transforming the fall color image information into the LCH color space and using the techniques described above to map the out-of-gamut values into a desired printing space are not necessary. All that is necessary, is that the KR values or values in any other desired space be within a printing gamut such that the complementary halftone screens can be effectively applied.

Likewise, the image forming apparatus 10 need not include an image value transformer 3 that is capable of transforming full color image information into the LCH color space. Instead, full color image information could be transformed into the printing color space, such as the KR space, out-of-gamut values mapped into a printing gamut, and complementary halftone screens applied to the resulting values.

While the invention has been described with the specific embodiments, the description of the specific embodiments is illustrative only and is not to be construed as limiting the scope of the invention. Various other modifications and changes may occur to those skilled in the art without departing from the spirit and scope of the invention.

What is claimed is:

1. An image forming apparatus comprising:
    an image value transformer that transforms image information in a first color space to a second color space;
    an image value mapper that maps out-of-gamut first color space values into a printing gamut in the first color space;
    a halftone screen processor that applies complementary halftone screens to values in the second color space; and
    a controller that controls the operation of at least one of the image value transformer, the image value mapper, and the halftone screen processor.

2. The apparatus of claim 1, further comprising a display that generates a visual representation of an image based on information output by the halftone screen processor.

3. The apparatus of claim 1, wherein the first color space is a LCH color space.

4. The apparatus of claim 3, wherein the image value mapper maps out-of-gamut LC values into the printing gamut by maintaining a constant L value.

5. The apparatus of claim 3, wherein the image value mapper maps out-of-gamut LC values into the printing gamut.

6. The apparatus of claim 1, wherein the second color space is the KR color space, the printing gamut is defined as all values within a region bounded by K+R=C, K=0 and R=0, where C is a maximum value for K and R, and the halftone screen processor generates tint information by applying the complementary halftone screens.

7. The apparatus of claim 1, wherein the halftone screen processor generates tint information by applying the complementary halftone screens.

8. A method for processing image information, comprising:
    converting image information in a first color space to a second color space;
    determining if the first color space information is within a printing gamut in the first color space;
    mapping the first color space information into the printing gamut if the first color space information is out of the printing gamut in the first color space; and
    applying complementary halftone screens to the second color space information.

9. A method for processing image information representing an image, comprising:
    transforming the image information in a first color space into an intermediate color space;
    determining if the intermediate color space image information is in a printing gamut in the intermediate color space;
    mapping out-of-gamut intermediate color space image information into the printing gamut in the intermediate color space; and
    transforming the intermediate color space image information into the second color space.

10. The method of claim 9, further comprising:
    mapping out-of-gamut second color space image information into a printing gamut.

11. The method of claim 9, wherein the step of converting image information comprises:
    applying complementary halftone screens to the second color space image information to generate tint information.

12. A method of converting image information comprising:
- transforming image information in the first color space into a LCH color space;
- determining if an LC value for each pixel in the image is in a printing gamut in the LCH color space;
- mapping out-of-gamut LC values into the printing gamut in the left color space; and
- transforming the LC values into a second color space.

13. The method of claim 12, wherein the step of mapping out-of-gamut LC values comprises:
- maintaining a constant L value.

14. The method of claim 12, wherein the step of mapping out-of-gamut LC values comprises:
- selecting a point at a boundary of the printing gamut that intersects a line between the out-of-gamut LC value and a midpoint on the L axis.

15. The method of claim 12, wherein the second color space is the KR color space and the printing gamut is defined as all points within a region bounded by K+R=C, K=0 and R=0, where C is a constant equal to a maximum value of each of K and R.

16. An image forming device, comprising:
- image value converting means for converting image information in a first color space into a second color space; wherein the image information converting means includes:
  - image value transforming means for transforming image values from the first color space to the second color space;
  - image value mapping means for mapping out-of-gamut values in the first color space into a printing gamut in the first color space; and
  - halftone screening means for applying complementary halftone screens to image information in the second color space to obtain tint information.

17. The image forming device of claim 16, further comprising display means for forming a visual representation of an image represented by image information in the first color space.

* * * * *